United States Patent
Kang et al.

(10) Patent No.: US 8,614,781 B2
(45) Date of Patent: Dec. 24, 2013

(54) LIQUID CRYSTAL DISPLAY AND MANUFACTURING METHOD THEREOF HAVING PARTICULAR CAPPING LAYER

(75) Inventors: Su-Hyoung Kang, Bucheon-si (KR); Yoon Ho Khang, Yongin-si (KR); Se Hwan Yu, Seoul (KR); Yong Su Lee, Hwaseong-si (KR); Chong Sup Chang, Hwaseong-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 138 days.

(21) Appl. No.: 13/409,910

(22) Filed: Mar. 1, 2012

(65) Prior Publication Data

US 2013/0093985 A1    Apr. 18, 2013

(30) Foreign Application Priority Data

Oct. 18, 2011 (KR) .................. 10-2011-0106537

(51) Int. Cl.
*G02F 1/1339* (2006.01)
*G02F 1/1333* (2006.01)
*G02F 1/1335* (2006.01)

(52) U.S. Cl.
USPC ............ 349/153; 349/138; 349/106; 349/110

(58) Field of Classification Search
USPC ................................ 349/153, 138, 106, 110
See application file for complete search history.

(56) References Cited

U.S. PATENT DOCUMENTS

| 7,382,432 B2 | 6/2008 | Yanagawa et al. |
| 7,554,636 B2 | 6/2009 | Nakatsugawa |
| 8,000,065 B2 * | 8/2011 | Yamazaki ................ 360/324.12 |
| 2005/0151918 A1 | 7/2005 | Park et al. |
| 2008/0068553 A1 | 3/2008 | Tomita et al. |
| 2013/0032794 A1 * | 2/2013 | Lee et al. ......................... 257/43 |

FOREIGN PATENT DOCUMENTS

| JP | 10-062792 | 3/1998 |
| JP | 2008-089775 | 4/2008 |
| KR | 10-2002-0064402 | 8/2002 |
| KR | 10-0354252 | 9/2002 |
| KR | 10-2005-0114141 | 12/2005 |
| KR | 2006-058607 | 3/2006 |
| KR | 2008-076938 | 4/2008 |
| KR | 10-0853779 | 8/2008 |
| KR | 10-2012-0026880 | 3/2012 |

OTHER PUBLICATIONS

English Abstract for Publication No. 10-062792.
English Abstract for Publication No. 10-2002-0064402.
English Abstract for Publication No. 10-0354252.
English Abstract for Publication No. 10-0853779.

(Continued)

*Primary Examiner* — Mike Qi
(74) *Attorney, Agent, or Firm* — F. Chau & Associates, LLC (57) ABSTRACT

A liquid crystal display is provided. The liquid crystal display includes a substrate. A thin film transistor is disposed on the substrate. A passivation layer is disposed on the thin film transistor. A pixel electrode is disposed on the passivation layer. A minute space layer is disposed on the pixel electrode and includes a liquid crystal injection hole. A first overcoat is disposed on the minute space layer. A common electrode is disposed on the first overcoat. A capping layer covers the liquid crystal injection hole. The capping layer includes graphene.

20 Claims, 6 Drawing Sheets

(56) References Cited

OTHER PUBLICATIONS

English Abstract for Publication No. 10-2005-0114141.
English Abstract for Publication No. 2006-058607.
English Abstract for Publication No. 2008-076938.
English Abstract for Publication No. 2008-089775.
English Abstract for Publication No. 10-2012-0026880.

* cited by examiner

FIG. 6

LIQUID CRYSTAL DISPLAY AND MANUFACTURING METHOD THEREOF HAVING PARTICULAR CAPPING LAYER

CROSS-REFERENCE TO RELATED APPLICATION

This application claims priority to Korean Patent Application No. 10-2011-0106537 filed in the Korean Intellectual Property Office on Oct. 18, 2011, the entire contents of which are incorporated by reference herein.

TECHNICAL FIELD

Embodiments of the present invention relate to a liquid crystal display, and more particularly, to a liquid crystal display and a manufacturing method thereof.

DISCUSSION OF THE RELATED ART

A liquid crystal display panel, which is one of the more common types of flat panel displays currently in use, includes two substrate sheets. The substrates include field generating electrodes such as a pixel electrode and a common electrode. A liquid crystal layer is interposed between the two substrates.

The liquid crystal display generates electric fields in the liquid crystal layer by applying voltage to the field generating electrodes. The generated electric fields determine the alignment of liquid crystal molecules of the liquid crystal layer interposed between the two substrates. The polarization of incident light may thereby be controlled and in so doing, various images may be displayed.

To form the liquid crystal layer, a liquid crystal material may be injected through a liquid crystal injection hole. After injection is complete, the liquid crystal injection hole may be capped by the insertion of a thermal hardening polymer resin that seals the liquid crystal material between the two substrates.

However, the thermal hardening polymer resin capping the liquid crystal injection hole makes contact with the liquid crystal material and accordingly, the thermal hardening polymer resin may contaminate the liquid crystal material.

SUMMARY

Exemplary embodiments of the present invention provide a liquid crystal display including a capping layer capping a liquid crystal injection hole. The capping layer is configured to not contaminate a liquid crystal layer of the liquid crystal display. Exemplary embodiments of the present invention also provide methods for manufacturing the liquid crystal display.

A liquid crystal display according to an exemplary embodiment of the present invention includes a substrate. A thin film transistor is disposed on the substrate. A passivation layer is disposed on the thin film transistor. A pixel electrode is disposed on the passivation layer. A minute space layer is disposed on the pixel electrode. The minute space layer includes a liquid crystal injection hole. A first overcoat is disposed on the minute space layer. A common electrode is disposed on the first overcoat. A capping layer covers the liquid crystal injection hole. The capping layer is formed of a graphene.

The minute space layer may include a liquid crystal material.

A color filter may be disposed on the common electrode. The capping layer may cover the color filter.

The minute space layer may include a plurality of regions corresponding to each pixel area. A groove may be formed between each of the plurality of regions of the minute space layer.

The groove may extend along a transverse or longitudinal direction.

The groove may be formed within a light blocking member on the first overcoat.

The liquid crystal injection hole may extend along the groove.

A light blocking member may extend along the groove.

An insulating layer may be disposed on the color filter.

A second overcoat may be disposed on the capping layer.

The thin film transistor may include a gate line disposed on the substrate, a data line intersecting the gate line and connected to a source electrode, and a drain electrode facing the source electrode.

A manufacturing method of a liquid crystal display according to an exemplary embodiment of the present invention includes forming a thin film transistor on a substrate. A passivation layer is formed on the thin film transistor. A pixel electrode is formed on the passivation layer. A sacrificial layer is formed on the pixel electrode. A first overcoat is formed on the sacrificial layer. A light blocking member including a groove is formed on the first overcoat. A common electrode is formed on the light blocking member. A color filter is formed on the common electrode. The sacrificial layer is removed through the groove using an ashing process. An alignment layer is formed on the pixel electrode and the common electrode. A liquid crystal material is injected through the groove to form a liquid crystal layer including a liquid crystal injection hole. A capping layer is formed of grapheme to cover the liquid crystal injection hole.

The forming of the capping layer may include coating the capping material covering the liquid crystal injection hole and heat-treating the capping material.

The forming of the thin film transistor may include forming a gate line on the substrate. A data line may be formed intersecting the gate line. The data line may be connected to a source electrode and a drain electrode facing the source electrode.

The light blocking member may be formed along the gate line or the data line.

The light blocking member may include the groove formed at a position overlapping the gate line or the data line.

The method may further include forming a second overcoat on the capping layer.

As described above, according to an exemplary embodiment of the present invention, the liquid crystal injection hole is covered by the capping layer. The capping layer may be formed with grapheme and may strongly resist transmission to gas such that the liquid crystal injection hole is sealed without contamination of the liquid crystal.

A liquid crystal display includes a substrate. A thin film transistor array is disposed on the substrate. A liquid crystal layer is disposed on the thin film transistor array and includes an injection hole for receiving an injection of liquid crystal molecules into the liquid crystal layer. A capping layer covers the injection hole and contains the liquid crystal molecules within the liquid crystal layer. The capping layer includes graphene.

The liquid crystal display may additionally include a passivation layer disposed on the thin film transistor array. A pixel electrode may be disposed on the passivation layer. The liquid crystal layer may be disposed on the pixel electrode.

The liquid crystal layer may include a minute space layer disposed on the pixel electrode for containing the liquid crystal molecules, the injection hole leading into the minute space layer.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Exemplary embodiments of the present invention will be described more fully hereinafter with reference to the accompanying drawings. The described embodiments may be modified in various different ways, all without departing from the spirit or scope of the present invention.

In drawings, the thickness of layers and regions may be exaggerated for clarity. It is to be noted that when a layer is referred to as being "on" another layer or substrate, the layer can be directly formed on the other layer or substrate or additional layers may be interposed therebetween. Like constituent elements may be denoted by like reference numerals denotes throughout the specification.

Figure 1:
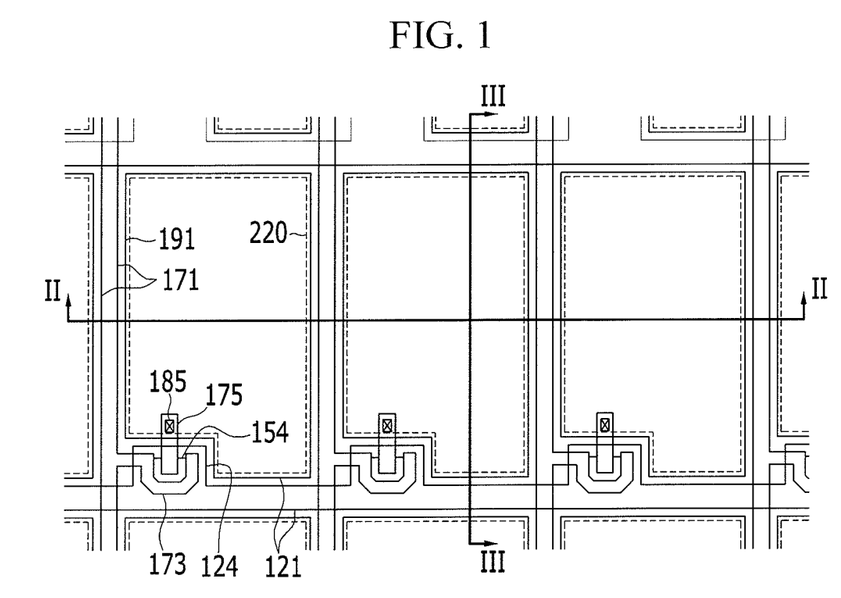
FIG. 1 is a top plan view of a liquid crystal display according to an exemplary embodiment of the present invention.
Figure 2:
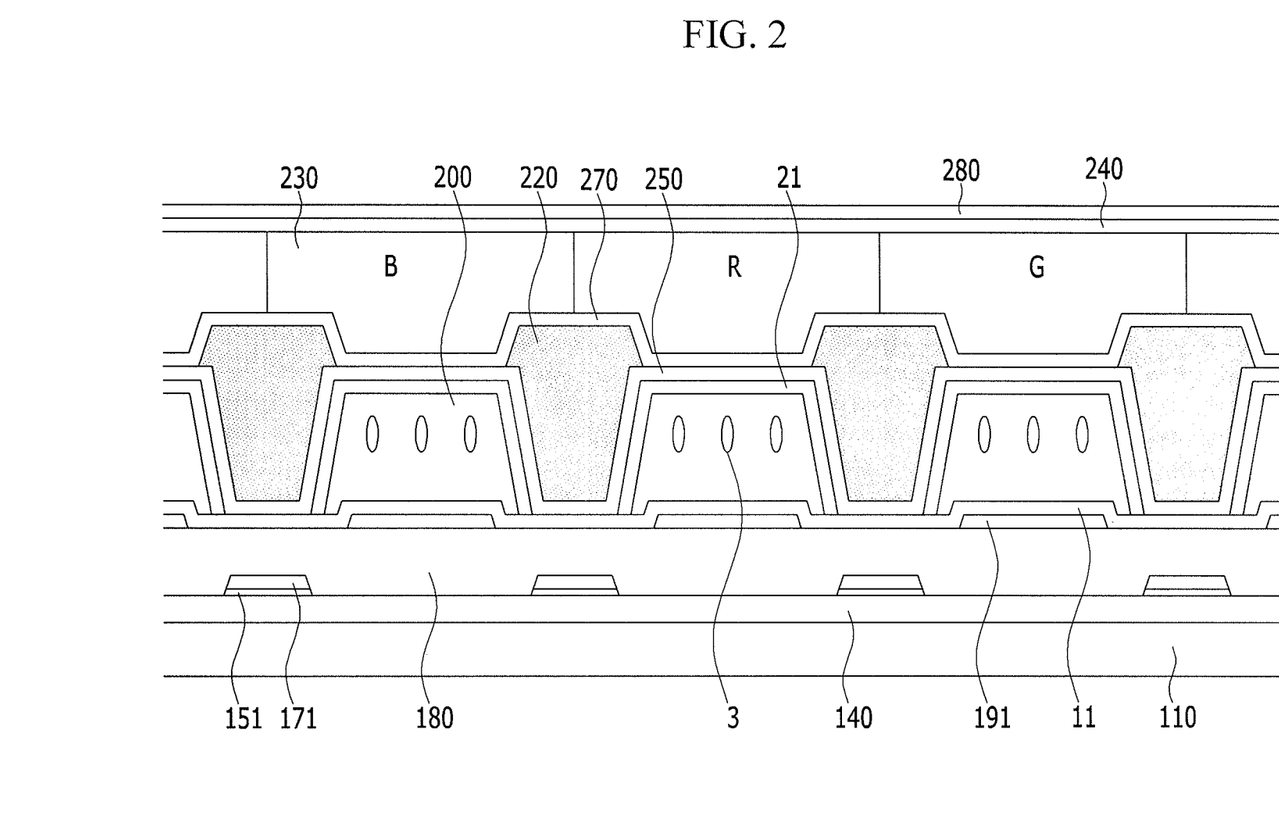
FIG. 2 is a cross-sectional view taken along II-II of FIG. 1.
Figure 3:
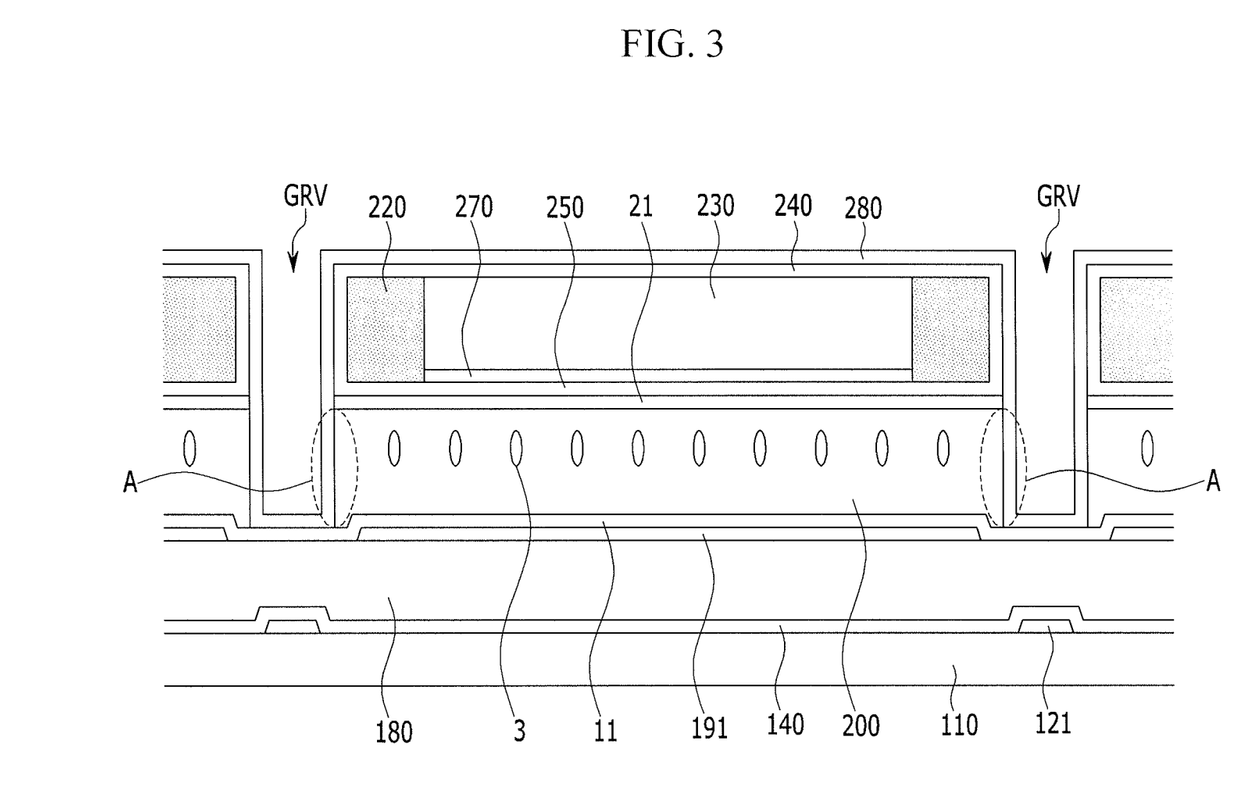
FIG. 3 is a cross-sectional view taken along III-III of FIG. 1.
Figure 4:
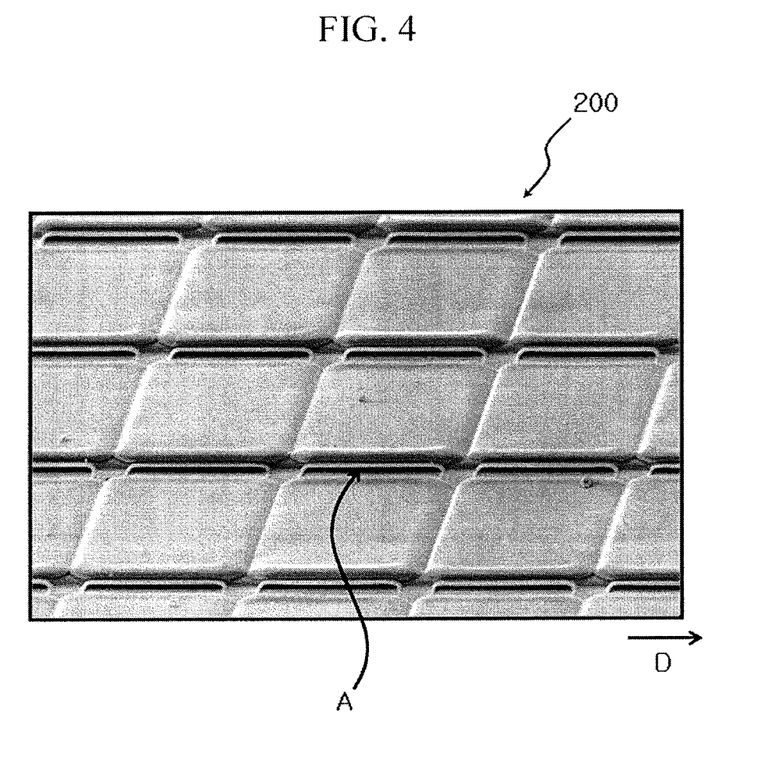
FIG. 4 is a perspective view of a minute space layer according to an exemplary embodiment.

FIG. 1 is a top plan view of a liquid crystal display according to an exemplary embodiment of the present invention. FIG. 2 is a cross-sectional view taken along II-II of FIG. 1. FIG. 3 is a cross-sectional view taken along III-III of FIG. 1. FIG. 4 is a perspective view of a minute space layer according to exemplary embodiments of the present invention.

Referring to FIG. 1 to FIG. 3, a plurality of gate lines 121 are formed on a first substrate 110 made of transparent glass or plastic.

The gate lines 121 transmit a gate signal and extend in a transverse direction. Each gate line 121 includes a plurality of gate electrodes 124 protruding from the gate line 121.

The gate line 121 and the gate electrode 124 may include one or more of aluminum-based metals such as aluminum (Al) and aluminum alloys, silver-based metals such as silver (Ag) and silver alloys, or copper-based metals such as copper (Cu) and copper alloys.

The gate line 121 and the gate electrode 124 are shown as being made of a single layer; however they may be made of a dual layer, a triple layer, or more layers.

In a case of the dual-layer structure, the gate line 121 and the gate electrode 124 may include a lower layer and an upper layer. The lower layer may include one or more of molybdenum (Mo), molybdenum alloys, chromium (Cr), chromium alloys, titanium (Ti), titanium alloys, tantalum (Ta), tantalum alloys, manganese (Mn), or manganese alloys. The upper layer may include one or more of an aluminum-containing metal of aluminum (Al) and aluminum alloys, a silver-containing metal of silver (Ag) and silver alloys, and a copper-containing metal of copper (Cu) or copper alloys. In a case of the triple-layer structure, layers having different physical properties may be combined.

A gate insulating layer 140 is formed on the gate line 121.

A plurality of semiconductor layers 151 are formed on the gate insulating layer 140. The semiconductor layers 151 extend in a mainly longitudinal direction and include a plurality of projections 154 extending toward the gate electrodes 124.

A plurality of data lines 171 respectively connected to a plurality of source electrodes 173 and a plurality of drain electrodes 175 are formed on the semiconductor layer 151.

The data lines 171 transmit a data signal, extend in a mainly longitudinal direction, and intersect the gate lines 121. Each data line 171 is connected to a plurality of source electrodes 173 having a "U" shape and extending toward the gate electrode 124.

The drain electrode 175 is separated from the data line 171 and extends in the center of the "U" shape of the source electrode 173. The shape of the source electrode 173 and the drain electrode 175 may be different than what is shown and described herein.

The data line 171, the source electrode 173, and the drain electrode 175 may include an aluminum-containing metal of aluminum (Al) and aluminum alloys, a silver-containing metal of silver (Ag) and silver alloys, and a copper-containing metal of copper (Cu) and copper alloys.

The data line 171, the source electrode 173, and the drain electrode 175 are shown and described as being formed as a single layer; however they may be formed as the dual layer, the triple layer, or more layers.

In a case of the dual-layer structure, the data line 171, the source electrode 173, and the drain electrode 175 may be made of a lower layer and an upper layer. The lower layer may include one or more of molybdenum (Mo), molybdenum alloys, chromium (Cr), chromium alloys, titanium (Ti), titanium alloys, tantalum (Ta), tantalum alloys, manganese (Mn), or manganese alloys. The upper layer may include one or more of an aluminum-containing metal of aluminum (Al) and aluminum alloys, a silver-containing metal of silver (Ag) and silver alloys, or a copper-containing metal of copper (Cu) and copper alloys. In a case of the triple-layer structure, layers having different physical properties may be combined.

The projection 154 of the semiconductor layer 151 includes an exposed portion that is not covered by the data line 171 and the drain electrode 175. The projection 154 is disposed between the source electrode 173 and the drain electrode 175. The semiconductor layer 151 has substantially the same planar pattern as the data line 171 and the drain electrode 175 except for the exposed portion of the projection 154. Lateral walls of the data line 171, the source electrode 173, and the drain electrode 175 may be substantially and equally aligned to the lateral wall of the underlying semiconductor layer 151. These patterns are formed by patterning a data wire layer 171, 173, and 175 (including the data line 171, the source electrode 173, and the drain electrode 175) and the semiconductor layer 151 through the same mask.

One gate electrode 124, one source electrode 173, and one drain electrode 175 form one thin film transistor (TFT) along with the projection 154 of the semiconductor layer 151. A channel of the thin film transistor is formed in the projection 154 between the source electrode 173 and the drain electrode 175.

A passivation layer 180 is formed on the data line 171, the drain electrode 175, and the projection 154 of the exposed semiconductor layer. The passivation layer 180 is made of an inorganic insulator such as silicon nitride or silicon oxide, an organic insulator, or an insulating material having a low dialectic constant.

A plurality of pixel electrodes 191 are formed on the passivation layer 180. Each pixel electrode 191 is physically and electrically connected to the drain electrode 175 through a contact hole 185. The pixel electrodes 191 receive a data voltage from the drain electrode 175. The pixel electrode 191 may be made of a transparent conductor such as ITO or IZO.

Although not shown, the pixel electrode 191 may be formed as a plurality of sub-electrodes or a minute slit electrode.

A lower alignment layer 11 is formed on the pixel electrode 191 and may be a vertical alignment layer. The lower alignment layer 11 may be a liquid crystal alignment layer and may include a material such as polyamic acid, polysiloxane, or polyimide.

A minute space layer 200 is disposed on the lower alignment layer 11. The minute space layer 200 is injected with a liquid crystal material including liquid crystal molecules 3. The minute space layer 200 has a liquid crystal injection hole "A". The minute space layer 200 may be formed to extend along a column direction of the pixel electrode 191. The liquid crystal material may be injected to the minute space layer 200 by using a capillary force.

Referring to FIG. 3 and FIG. 4, the minute space layer 200 includes a plurality of regions divided by a plurality of grooves GRV overlapping the gate line 121. The grooves GRV may be formed to extend along the direction that the gate line 121 is extended in. A plurality of regions of the minute space layer 200 may correspond to each pixel area and may be disposed along the direction D that the gate line 121 is extended in.

The liquid crystal injection hole A is disposed between the lower alignment layer 11 and an upper alignment layer 21. The liquid crystal injection hole A may be formed along the direction that the grooves GRV are extended in. In FIG. 3, the liquid crystal injection hole A is formed along the direction D that the gate line 121 is extended in.

The grooves GRV are formed along the direction that the gate line 121 is extended in. However, the grooves GRV may be formed along the direction that the data line 171 is extended in. Accordingly, a plurality of regions of the minute space layer 200 are disposed along the vertical direction and the liquid crystal injection hole A may be formed along the direction that the data line 171 is extended in.

An upper alignment layer 21 is disposed on the minute space layer 200 and a first overcoat 250 is disposed on the upper alignment layer 21. The first overcoat 250 may be formed of silicon nitride (SiNx) or silicon oxide (SiO2).

A light blocking member 220 that is formed along the direction that the gate line 121 and the data line 171 are extended in is formed on the first overcoat 250. The light blocking member 220 includes a groove GRV disposed at the portion overlapping the gate line 121. The light blocking member 220 is disposed at a portion that is not substantially part of the pixel area (not shown).

The light blocking member 220 may be referred to as a black matrix. The light blocking member 220 prevents light leakage.

A common electrode 270 is disposed on the light blocking member 220 and the first overcoat 250. The common electrode 270 receives a common voltage and the pixel electrode 191 is applied with the data voltage. An electric field is accordingly generated along the common electrode 270 and the pixel electrode 191. The generated electric field determines an inclination direction of the liquid crystal molecules 3 disposed in the minute space layer 200 between two electrodes. The common electrode 270 and the pixel electrode 191 form a capacitor (hereafter referred to as "a liquid crystal capacitor") to maintain the applied voltage after the thin film transistor is turned off Color filters 230 are formed on the common electrode 270. The color filters 230 may have a length that is substantially equal to a width of the column of the pixel electrode 191.

Each of the color filters 230 may display one of the primary colors such as red, green, or blue. However, it is not limited to the three primary colors such as red, green, and blue, and may display one of cyan, magenta, yellow, and white-based colors.

An insulating layer 240 is disposed on the color filter 230. The insulating layer 240 flattens and protects the color filters 230. The insulating layer 240 may be made with the same material as the first overcoat 250 and may cover the side surface of the light blocking member 220. However, the insulating layer 240 is not always needed and may be omitted.

A capping layer 280 is disposed on the insulating layer 240. The capping layer 280 covers the liquid crystal injection hole A of the minute space layer 200 exposed by the groove GRV. The capping layer 280 may include graphene. For example, the capping layer 280 may be formed of a single layer of graphene.

A capping layer 280 including graphene has the ability to resist the transmission of gas, including helium, there through. Accordingly, the capping layer 280 made of graphene may effectively contain the liquid crystal within the minute space layer 200 by capping the liquid crystal injection hole A. Because graphene is comprised of carbon, a capping layer 280 made of graphene would not contaminate the liquid crystal layer. Also, the graphene protects the liquid crystal material from oxygen or moisture from the outside.

The liquid crystal material is injected through the liquid crystal injection hole A of the minute space layer 200 thereby forming the liquid crystal display without an additional formation in an upper substrate.

Figure 5:
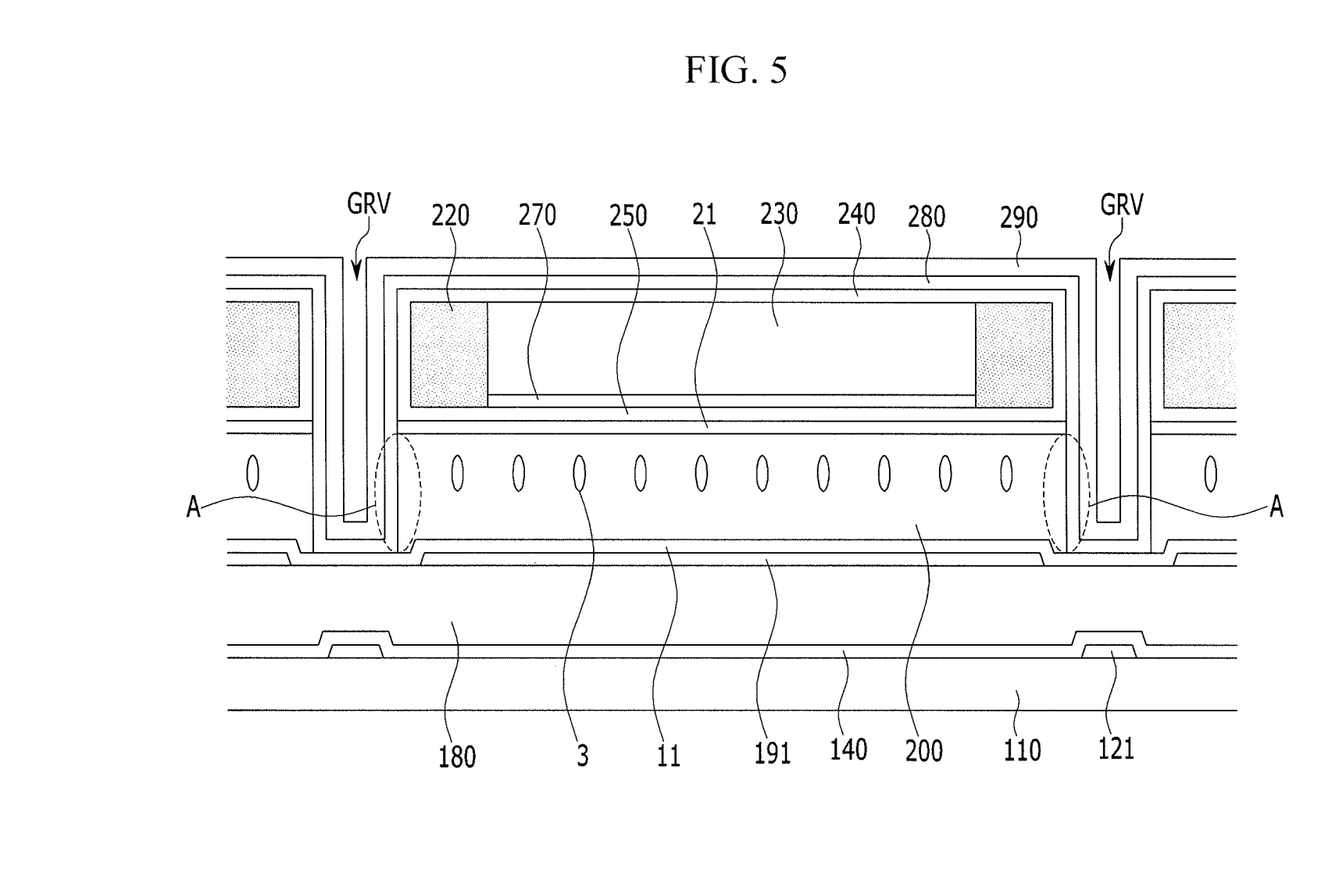
FIG. 5 is a cross-sectional view of a liquid crystal display according to an exemplary embodiment of the present invention.

FIG. 5 is a cross-sectional view of a liquid crystal display according to an exemplary embodiment of the present invention.

Referring to FIG. 5, many elements are the same as described above with respect to FIG. 3. However, in FIG. 5, a second overcoat 290 is formed on the capping layer 280.

The second overcoat 290 may be formed of the inorganic layer or the organic layer.

The second overcoat 290 is additionally formed on the capping layer 280 such that the liquid crystal molecules 3 injected into the minute space layer 200 are protected from an external impact that may flatten them.

Figure 6:
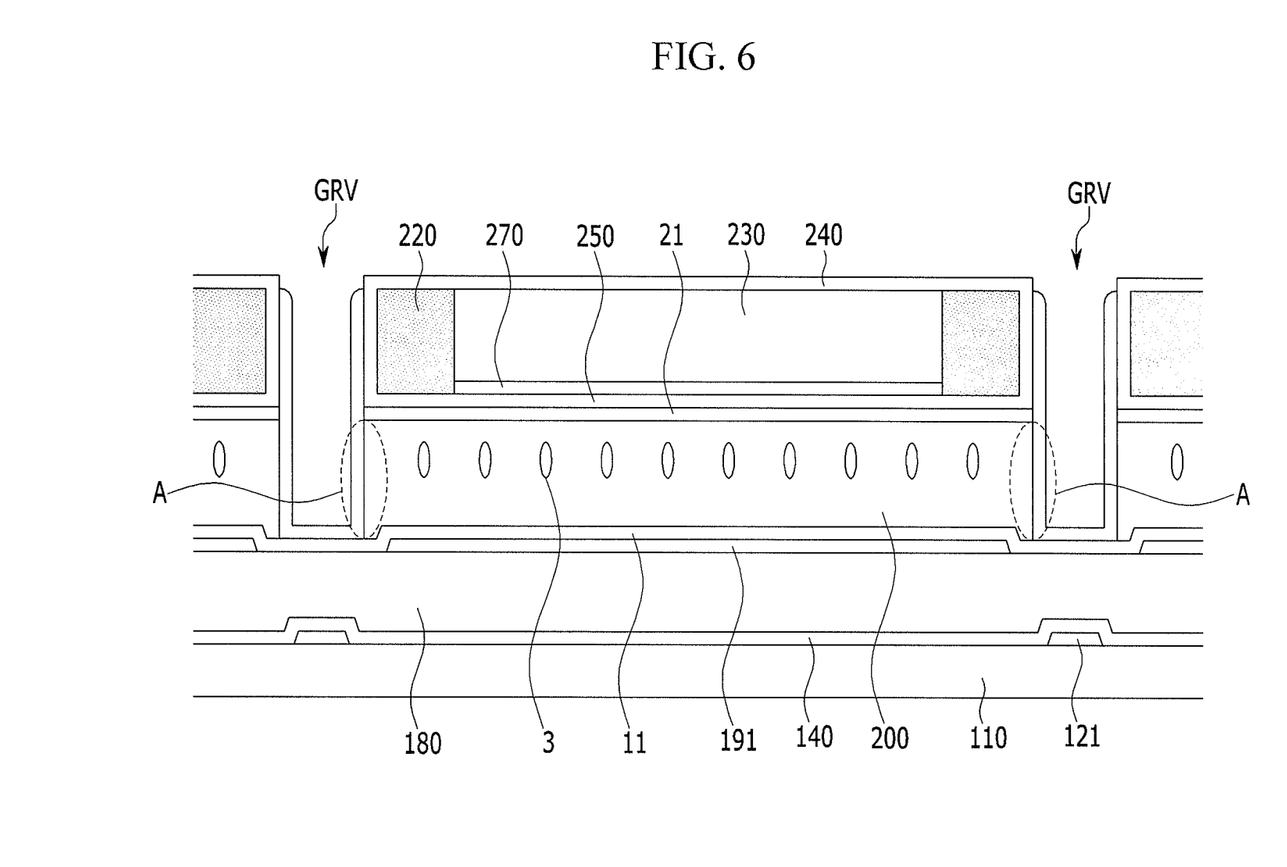
FIG. 6 is a cross-sectional view of a liquid crystal display according to an exemplary embodiment of the present invention.

FIG. 6 is a cross-sectional view of a liquid crystal display according to an exemplary embodiment of the present invention.

Referring to FIG. 6, many elements are the same as described above with respect to FIG. 5. However, in FIG. 6, the capping layer 280 only covers the circumference of the liquid crystal injection hole A and the capping layer 280 is removed, or otherwise not formed, on the upper surface of the insulating layer 240. Alternatively, a portion of the capping layer 280 is disposed on the upper surface of the insulating layer 240 and a portion of the capping layer 280 may be removed, or otherwise not formed, between the side surface of the minute space layer 200 and the upper surface of the insulating layer 240.

When the capping layer 280 is formed on the upper surface of the insulating layer 240 overlapping the common electrode 270, an un-desired electric field may be generated and the alignment of the liquid crystal molecule may be affected. According to exemplary embodiments of the present invention, the capping layer 280 only covers the circumference of the liquid crystal injection hole A and the capping layer 280 is removed, or otherwise not formed, at the edge of the portion overlapping the minute space layer 200, the insulating layer 240, the portion overlapping the minute space layer 200, or the insulating layer 240 such that the un-desired electric field caused by the graphene, which has a degree of conductivity, may be prevented. As described above, the second overcoat 290 is an optional feature and may either be included or omitted.

A method of manufacturing the liquid crystal display according to an exemplary embodiment described in FIG. 1 to FIG. 4 is described below.

Again referring to FIG. 1 to FIG. 4, a plurality of gate lines 121 extending in the transverse direction are formed on the first substrate 110. Each gate line 121 includes gate electrodes 124 protruding upward.

A gate insulating layer 140 covering the gate line 121 including the gate electrode 124 is formed. A plurality of semiconductor layers 151 made of amorphous or crystalline silicon is formed on the gate insulating layer 140. The semiconductor layer 151 primarily extends in the longitudinal direction and includes a projection 154 extending toward the gate electrode 124. The projections 154 are disposed corresponding to the gate electrode 124.

A plurality of data lines 171 respectively connected to a plurality of source electrodes 173 and a plurality of drain electrodes 175 are formed on the semiconductor layer 151. Each data line 171 of the plurality is formed to intersect a gate line 121.

Although not shown, an ohmic contact may be formed between the data line 171, source electrode 173, and drain electrode 175 and the semiconductor layer 151 including the projection 154.

A passivation layer 180 made of the inorganic insulator such as silicon nitride or silicon oxide is formed on the data line 171, the source electrode 173, and the drain electrode 175. The pixel electrode 191 made of the transparent conductive material such as ITO or IZO is formed on the passivation layer 180.

A sacrificial layer (not shown) is formed on the pixel electrode 191. The sacrificial layer is later removed. The sacrificial layer is formed in a portion of the pixel electrode 191 where the minute space layer is formed. The sacrificial layer is formed along the column of the pixel electrode 191 and may have a separated space at a portion overlapping the data line 171.

The first overcoat 250 made of silicon nitride (SiNx) or silicon oxide (SiO2) is formed on the sacrificial layer. The first overcoat 250 may be formed while covering the separated space of the sacrificial layer overlapping the data line 171.

A patterned light blocking member 220 is formed on the first overcoat 250. The light blocking member 220 may be formed with a matrix shape along the direction that the gate line 121 and the data line 171 are extended. The light blocking member 220 may be disposed at a location that does not cover the pixel area (not shown) substantially defined by the gate line 121 and the data line 171. However, the pixel area (not shown) need not be defined by the gate line 121 and the data line 171.

A light blocking member 220 is formed. The light blocking member 220 includes a groove GRV overlapping the gate line 121. The groove GRV fills the separated space of the sacrificial layer overlapping the data line 171 disposed between a plurality of minute space layers 200. At this time, the groove GRV overlapping the gate line 121 is not filled by the light blocking member 220 and remains in the opened state. The portion of the first overcoat 250 disposed at the portion overlapping the gate line 121 is removed such that the sacrificial layer is exposed by the groove GRV. The sacrificial layer is later removed such that the liquid crystal material is injected through the groove GRV disposed at the portion overlapping the gate line 121.

A common electrode 270 made of the transparent conductive material such as ITO or IZO is formed on the light blocking member 220 or the first overcoat 250. Color filters 230 are formed along the column of the pixel electrode 191 on the common electrode 270. The insulating layer 240 made of silicon nitride or silicon oxide is formed on the color filter 230.

The sacrificial layer is removed, for example, by $O_2$ ashing through the groove GRV disposed at the portion overlapping the gate line 121. At this time, the minute space layer 200 having the liquid crystal injection hole A is formed. The liquid crystal injection hole A may be formed along the direction that the gate line 121 or the data line 171 is extended.

An alignment material is injected through the groove GRV overlapping the gate line 121 to form alignment layers 11 and 21 on the pixel electrode 191 and the common electrode 270.

The liquid crystal material is injected to the minute space layer 200, for example, by using capillary force through the groove GRV overlapping the gate line 121 and the liquid crystal injection hole A. If the liquid crystal material is injected, the liquid crystal material may be exposed by the liquid crystal injection hole A such that the capping layer 280 covering the liquid crystal injection hole A is formed. The capping layer 280 is formed of graphene.

In forming the capping layer 280, the graphene is transferred to a substrate and then the substrate including the graphene is adhered to cover the liquid crystal injection hole A. Heat treatment is then performed, for example, by the use of ultraviolet rays or a hot plate to form the capping layer 280.

As shown in FIG. 5, the second overcoat 290 may be formed on the capping layer 280.

While exemplary embodiments of the present invention have been described with reference to the drawings, it is to be understood that the invention is not limited to the disclosed embodiments.

What is claimed is:

1. A liquid crystal display comprising:
   a substrate;
   a thin film transistor disposed on the substrate;
   a passivation layer disposed on the thin film transistor;
   a pixel electrode disposed on the passivation layer;
   a minute space layer disposed on the pixel electrode, and
      the minute space layer including a liquid crystal injection hole capable of receiving an injection of liquid crystal molecules into the minute space layer;
   a first overcoat disposed on the minute space layer;
   a common electrode disposed on the first overcoat; and
   a capping layer covering the liquid crystal injection hole such that the injected liquid crystal molecules are contained within the minute space layer,
   wherein the capping layer includes graphene.

2. The liquid crystal display of claim 1, further comprising a color filter disposed on the common electrode.

3. The liquid crystal display of claim 2, wherein the capping layer covers the color filter.

4. The liquid crystal display of claim 1, wherein the minute space layer includes a plurality of regions corresponding to a plurality of pixel areas, and a groove is formed between the plurality of regions of the minute space layer.

5. The liquid crystal display of claim 4, wherein the groove extends along a transverse or longitudinal direction.

6. The liquid crystal display of claim 4, further comprising a light blocking member upon which the groove is disposed.

7. The liquid crystal display of claim 4, wherein the liquid crystal injection hole extends along the groove.

8. The liquid crystal display of claim 4, further comprising a light blocking member extending along the groove.

9. The liquid crystal display of claim 1, further comprising: an insulating layer disposed on a color filter.

10. The liquid crystal display of claim 1, further comprising a second overcoat disposed on the capping layer.

11. The liquid crystal display of claim 1, wherein the thin film transistor includes:
a gate line disposed on the substrate;
a data line intersecting the gate line and connected to a source electrode; and
a drain electrode facing the source electrode.

12. A method of manufacturing a liquid crystal display, comprising:
forming a thin film transistor on a substrate;
forming a passivation layer on the thin film transistor;
forming a pixel electrode on the passivation layer;
forming a sacrificial layer on the pixel electrode;
forming a first overcoat on the sacrificial layer;
forming a light blocking member, including a groove, on the first overcoat;
forming a common electrode on the light blocking member;
forming a color filter on the common electrode;
removing the sacrificial layer through the groove using an ashing process;
forming an alignment layer on the pixel electrode and the common electrode;
injecting a liquid crystal material through the groove to form a liquid crystal layer; and
forming a capping layer over the liquid crystal injection hole capable of containing the liquid crystal material,
wherein the capping layer includes graphene.

13. The method of claim 12, wherein the forming of the capping layer includes:
coating the capping material containing the liquid crystal material over the liquid crystal injection hole; and
heat-treating the capping material.

14. The method of claim 13, wherein the forming of the thin film transistor includes:
forming a gate line on the substrate; and
forming a data line intersecting the gate line and connected to a source electrode and a drain electrode facing the source electrode.

15. The method of claim 14, wherein the light blocking member is formed along the gate line or the data line.

16. The method of claim 14, wherein the groove is formed in the light blocking member at a position overlapping the gate line or the data line.

17. The method of claim 12, further comprising forming a second overcoat on the capping layer.

18. A liquid crystal display comprising:
a substrate;
a thin film transistor array disposed on the substrate;
a liquid crystal layer disposed on the thin film transistor array and including an injection hole for receiving an injection of liquid crystal molecules into the liquid crystal layer; and
a capping layer covering the injection hole and containing the liquid crystal molecules within the liquid crystal layer, the capping layer including graphene.

19. The liquid crystal display of claim 18, further comprising:
a passivation layer disposed on the thin film transistor array; and
a pixel electrode disposed on the passivation layer,
wherein the liquid crystal layer is disposed on the pixel electrode.

20. The liquid crystal layer of claim 18, wherein the liquid crystal layer includes a minute space layer disposed on the pixel electrode for containing the liquid crystal molecules, the injection hole leading into the minute space layer.

* * * * *